(12) United States Patent
Yamazoe et al.

(10) Patent No.: US 6,628,830 B1
(45) Date of Patent: Sep. 30, 2003

(54) IMAGE PROCESSING METHOD AND APPARATUS AND STORAGE MEDIUM

(75) Inventors: Manabu Yamazoe, Kawasaki (JP); Nobuo Ogura, Tokyo (JP); Akihiko Uekusa, Kawasaki (JP); Kentaro Yano, Yokohama (JP); Tetsuya Suwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/337,549

(22) Filed: Jun. 22, 1999

(30) Foreign Application Priority Data

Jun. 24, 1998 (JP) .......................................... 10-177134
Jun. 24, 1998 (JP) .......................................... 10-177135

(51) Int. Cl.⁷ ............................................... G06K 9/00
(52) U.S. Cl. ....................... 382/168; 382/167; 382/274; 358/518; 358/522
(58) Field of Search ........................ 382/162, 165–170, 382/274, 275; 345/589–590, 597–604; 358/1.9, 3.15, 3.26, 500, 515–523, 461, 448; 348/703, 687

(56) References Cited

U.S. PATENT DOCUMENTS

| 4,488,245 A | | 12/1984 | Dalke et al. ................. 364/526 |
|---|---|---|---|
| 4,928,167 A | * | 5/1990 | Tatsumi et al. .............. 358/523 |
| 5,467,196 A | | 11/1995 | Fukushima ................. 358/3.15 |
| 5,731,818 A | * | 3/1998 | Wan et al. ................... 345/590 |
| 5,748,773 A | | 5/1998 | Tashiro et al. .............. 382/169 |
| 5,930,009 A | * | 7/1999 | Sato et al. ................... 358/518 |

FOREIGN PATENT DOCUMENTS

| JP | 60-57594 | 4/1985 | ........... G11C/11/34 |
|---|---|---|---|

* cited by examiner

*Primary Examiner*—Leo Boudreau
*Assistant Examiner*—Ishrat Sherali
(74) *Attorney, Agent, or Firm*—Fitzpatrick, Cella, Harper & Scinto (57) ABSTRACT

Software of a simple configuration checks whether an original image to be corrected is an image picture, and an image correction process based upon a formed histogram of the original image is not performed for an image different from the image picture. An image processing condition is set in accordance with the formed histogram to perform the image correction process for the original image. An image processing method judges from a shape of the formed histogram whether the original image is an image picture, and does not perform not perform the image correction process for the original image if it is judged that the original image is not an image picture.

5 Claims, 8 Drawing Sheets

IDEAL COLOR SOLID

FIG. 11B

ACTUAL COLOR SOLID

FIG. 12

IMAGE PROCESSING METHOD AND APPARATUS AND STORAGE MEDIUM

BACKGROUND OF THE INVENTION

1. Field of the Invention

The present invention relates to an image processing method and apparatus for performing an image correction process in accordance with a histogram of an image, and to a storage medium storing program codes for executing such a method.

2. Related Background Art

With recent high speed personal computers, accelerated growth of high capacity memories, and particularly widespread of digital cameras and photograph scanners, a photograph can be digitalized easily even by general people. Chances of dealing with digital data of photographic images on a personal computer are increasing. A price of an output apparatus, typically an ink jet printer, is becoming low and general people's demands for outputting an image of a photograph at home is rapidly increasing.

However, an input photographic image is often associated with factors of degrading the quality of an output image such as color fogging, from the following reasons. For example, an image taken with a CCD of a digital camera contains wavelength of infrared light or the like insensitive to human eyes. Although an infrared cut filtering process is performed, this process is not fully perfect and color balance correction performed in a digital camera has constraints on a CPU and a real time process, which may result in a loss of the whole color balance. Further, although human eyes can look at a subject by correcting (adapting to) a difference of light source colors, a digital camera records a difference of light source colors on a film as it is. Therefore, even if the camera reproduces a photometrically correct color, color fogging occurs in some cases. Similar phenomenon may occur at a photograph scanner and a flat head scanner, so that even with the best conditions of an image on a negative film or a reversal film, a digitalized image may contain unbalanced color.

Furthermore, if a scene including a fair blue sky in most of the background is taken with a general camera as well as a digital camera under AE, under-exposure is likely to occur so that the whole image is dark and the main subject is not taken under the best conditions. In order to prevent such outputs, various color correction processes have been proposed in various fields, particularly in the photographic print field. More specifically, when a film taken with a silver salt camera is printed on a photographic paper at a photographic laboratory, generally each scene is automatically analyzed and corrected.

Consider next the case wherein RGB signals from an input apparatus are printed via a personal computer by an output apparatus, typically an ink jet printer. Color matching between the input and output apparatuses on the XYZ color space of CIE is performed, for example, by color sink of Macintosh of Apple Computer, Inc. or ICM of Windows of Microsoft Corporation. It is, however, very difficult to perform such adjustment strictly. This is because the input and output apparatuses have different color reproduction ranges and are different in their operation principles that the input apparatus uses R, G and B color signals and the output apparatus uses a reflection original of C, M, Y and K. In addition, if an image taken with the input apparatus is not satisfactory, a print reproduced even with high fidelity does not satisfy user's requirements. Namely, in order to obtain a good print result of an input image with poor exposure or unbalanced color caused by color fogging, the input image data itself is required to be corrected. In this context, an easier correction method has been desired which provides a sufficiently high process speed and does not require a cumbersome work by a user. In any case, it is a main issue that a definite algorithm for color balancing is not still developed.

There are some images which should not be corrected. For example, when an image is took with a camera mounted with a color filter, typically an LB filter, this means that the photographer intentionally wishes color fogging. Sepia image data having boomed recently or the like should also avoid hue correction. Therefore, such images intending special effects should avoid image correction such as removal of color fogging.

Another problem associated with correction of a photograph (image picture), a text, an image mixed with graphics such as figures and drawings, is that image correction for providing a good output result of an image picture is not proper if it is performed for graphics images or the like.

SUMMARY OF THE INVENTION

The present invention has been made in order to solve the above-described problems. It is an object of the present invention to easily judge whether or not image data to be corrected is an image picture, and to prevent an image correction process for texts, graphics images and the like different from the image pictures, from being performed in accordance with a histogram.

An image processing method of forming a histogram of an original image, setting an image processing condition in accordance with the formed histogram, and performing image processing for the original image, comprises the steps of: judging from a shape of the formed histogram whether the original image is an image picture; and if it is judged that the original image is not an image picture, not performing the image processing for the original image.

It is another object of the present invention to realize high precision nonlinear color balance correction by incorporating a simple configuration.

An image processing method comprises the steps of: forming a histogram of lightness of an original image; setting a correction condition for lightness components in accordance with the histogram of lightness; setting a correction condition for hue components in accordance with the correction condition for lightness; and correcting the original image in accordance with the correction conditions for lightness and hue.

It is another object of the present invention to easily discriminate images photographers wished special effects from other images so as not to perform an image correction process based upon a histogram.

An image processing method of performing an image correction process in accordance with a highlight point and a shadow point of an original image, comprises the steps of: forming a histogram of hue of the original image; judging from a shape of the formed histogram of hue whether the original image is subjected to the image correction process; and controlling the image correction process in accordance with a judged result.

Other objects and advantages of the invention will become apparent from the following description of embodiments taken in connection with the accompanying drawings.

DETAILED DESCRIPTION OF THE PREFERRED EMBODIMENTS

Embodiments of the invention will be detailed with reference to the accompanying drawings.

First Embodiment

Figure 1:
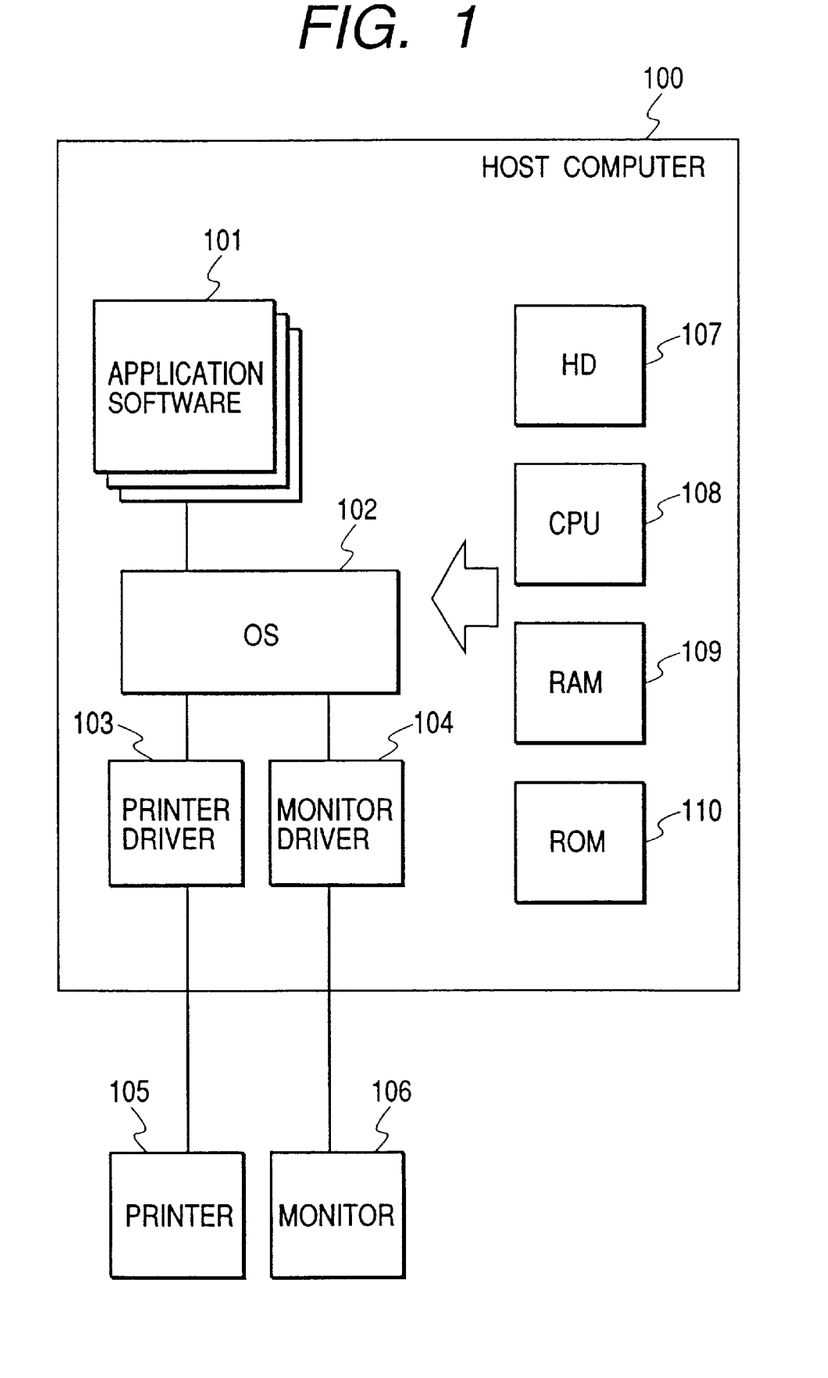
FIG. 1 is a diagram showing an example of a system configuration.

An example of the outline of a system of an embodiment is shown in FIG. 1. A host computer 100 is connected to a printer 105 such as an ink jet printer and a monitor 106. The host computer 100 has: application software 101 such as word processor software, spreadsheet software and Internet browser software; an OS (Operating System) 102; printer driver software 103 for generating print data by processing various drawing instructions (image drawing instruction, text drawing instruction, graphics drawing instruction) for an output image issued to OS 102 from the application software; and monitor driver software 104 for displaying an image on the monitor 106 by processing various drawing instructions issued from the application.

The host computer 100 has various units of hardware allowing the above-described software to run, such as a central processing unit CPU 108, a hard disk drive HD 107, a random access memory RAM 109, and a read-only memory ROM 110.

In the embodiment system shown in FIG. 1, a commonly prevailing IBM AT compatible personal computer may be used with Microsoft Windows 95 as an OS, arbitrary application software allowing printing being installed and the monitor and printer being connected.

In the host computer 100, the application software 101 generates output image data in accordance with an image displayed on the monitor, by using text data such as characters, graphics data such as figures, image picture data such as natural pictures or the like. When the output image data is to be printed out, the application software 101 requests a print-out from OS 102 and issues a drawing instruction group for an output image to OS 102. The drawing instruction group is constituted of a graphics drawing instruction for graphics data and an image drawing instruction for image picture data. Upon reception of the print-out request from the application software, OS 102 issues a drawing instruction group to the printer driver 103 for the printer 105. The printer driver 103 processes a print request and drawing instruction group input from OS 102 to generate print data printable at the printer 105 and transfer it to the printer 105. If the printer is a raster printer, the printer driver 103 sequentially performs an image correction process for each drawing instruction supplied from OS and sequentially rasterizes the drawing instruction on an RGB 24-bit page memory. After all drawing instructions are rasterized, the contents of the RGB 24-bit page memory are converted into a printable data format, e.g., CMYK data format and transferred to the printer.

Figure 2:
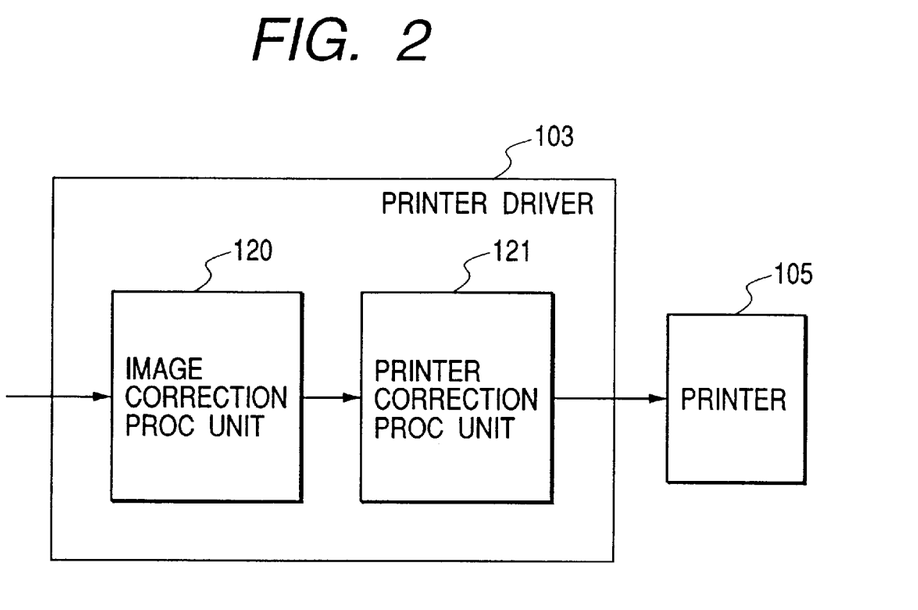
FIG. 2 is a diagram illustrating a process to be executed by a printer driver.

A process to be executed by the printer driver 103 will be described with reference to FIG. 2.

In the printer driver 103, an image correction process unit 120 performs an image correction process for color information contained in the drawing instruction group input from OS 102. A correction process unit 121 for the printer (referred to as a printer correction process unit 121 hereinafter) rasterizes each drawing instruction in accordance with the image correction processed color information to thereby generate a raster image on the RGB 24-bit page memory. Each pixel is subjected to a masking process, a gamma correction process, a quantizing process and the like respectively matching color reproductivity to generate CMYK data dependent upon the printer characteristics and transfer it to the printer 105.

Figure 3:
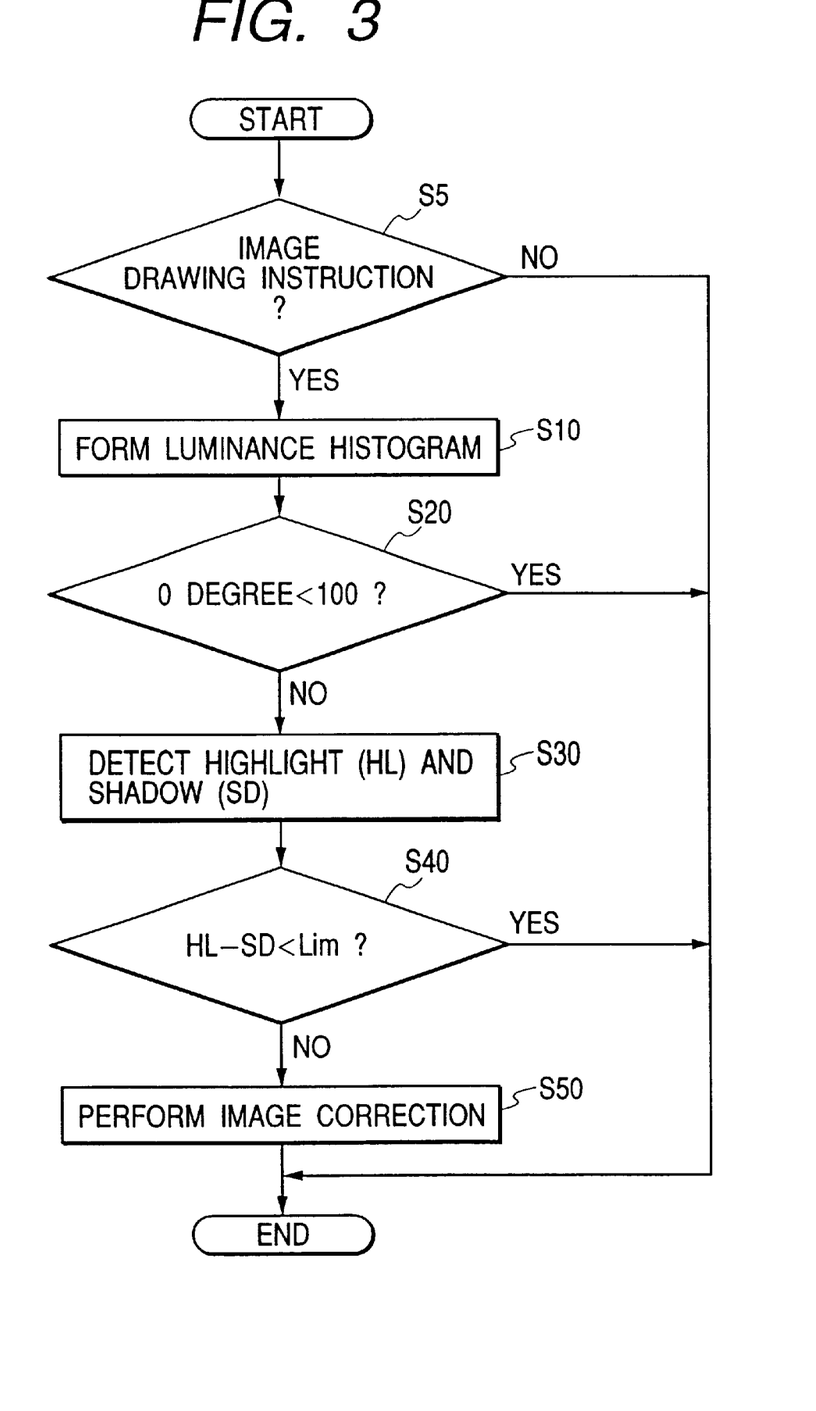
FIG. 3 is a flow chart illustrating a process to be executed by an image correction process unit.

Next, the image correction process to be executed independently for each original image by the image correction process unit 120 will be described with reference to FIG. 3.

The image correction process (color fogging correction, exposure correction) of the embodiment is, as described earlier, a process to be executed for an image to obtain a good output result of an image picture. However, if this image correction process is executed for graphics images or the like, the image quality may be degraded.

In this embodiment, therefore, it is judged whether an original image is an image picture, and the image correction process is executed only for the image picture.

First, at Step S5 it is checked whether a drawing instruction for an original image input from the application software via OS is an image drawing instruction or not. If the drawing instruction is an instruction such as a graphics drawing instruction different from the image drawing instruction, it is judged that the original image is not an image picture, and the image correction process is not performed for the original image.

If the drawing instruction is the image drawing instruction, it is judged that the original image is probably an image picture and at Step S10 a luminance histogram is formed. The details of a luminance histogram forming method will be later given.

At Step S20 it is judged from the number of luminances with a 0 degree whether the image correction process is to be performed for the original image. In other words, it is judged whether there is a possibility that the original image is an image picture.

Figure 5:
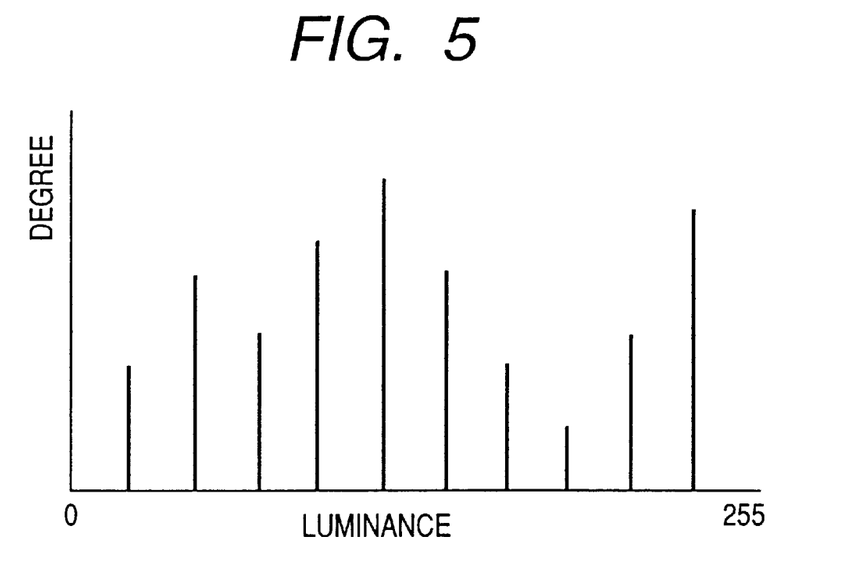
FIG. 5 shows an example of a luminance histogram of an image with specific colors.

An ordinary image picture has degrees of respective luminances distributed continuously. In contrast with this, a specific image such as graphics image is often constituted of particular colors and degrees of luminances are distributed intermittently such as shown in FIG. 5. This will be understood when considering a graph constituted of, for example, about 16 colors.

The number of luminances with the 0 degree of the histogram is calculated and if the number is larger than a predetermined value (e.g., a threshold value of 100 empirically obtained from a 256-gradation image or the like), then it is judged that the original image is not an ordinary image picture and color correction is not performed.

Next, if it is judged at Step S20 that the original image is subjected to correction, at Step S30 a highlight point HL and a shadow point SD are determined from the histogram.

At Step S40 it is judged from a difference, i.e., distance, between the highlight point HL and shadow point SD whether the image correction is to be performed. Namely, it is judged whether the original image is an image picture. If the difference is smaller than a predetermined value at Step S40, it is judged that the original image is not an image picture and the image correction process is not performed.

Figure 4:
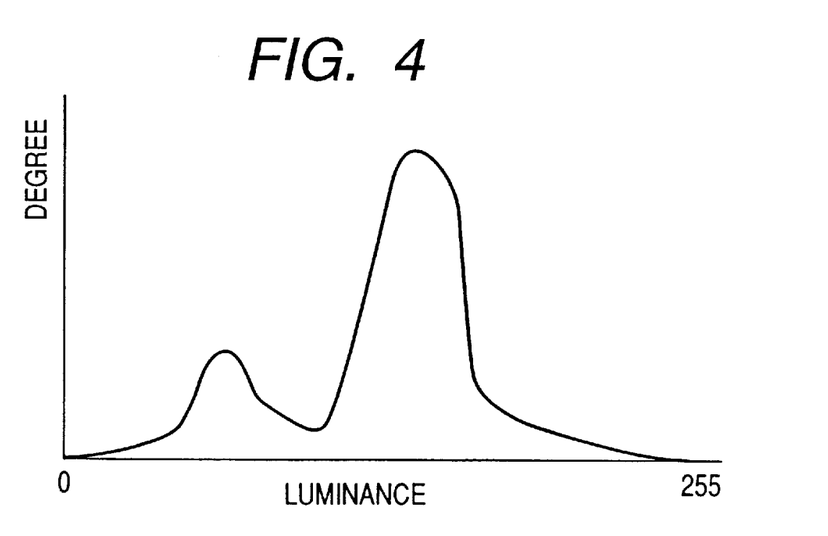
FIG. 4 shows an example of a luminance histogram of an image picture.
Figure 6:
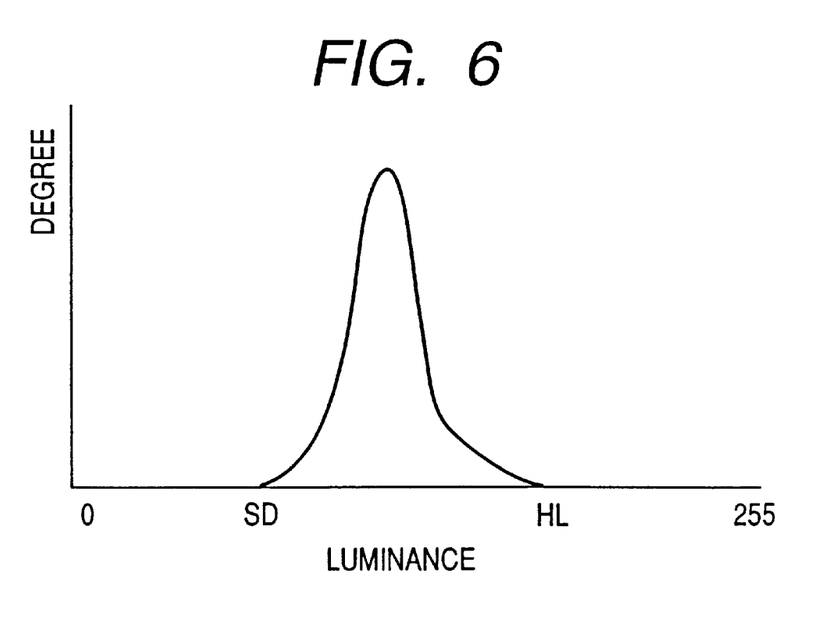
FIG. 6 shows an example of a luminance histogram of an image with a certain luminance range.

If the distribution of a histogram is in a certain luminance range such as shown in FIG. 6, this histogram is unnatural as the histogram of an image picture as becomes apparent from comparison with FIG. 4. Therefore, this original image is most probably a graphics image of computer graphics or an intentionally formed image picture, and the image correction process should not be performed.

Only an image eventually judged as an image picture is subjected to the image correction process under the image correction process conditions determined from the luminance histogram (Step S50). The image correction process includes color fogging correction, exposure correction and saturation correction, respectively to be later described.

As described above, according to the embodiment, in accordance with the shape or the like of a histogram of luminances or the like of an original image, an original image unnatural as an image picture is detected and excluded and only an image picture is subjected to the image correction process.

Therefore, it is possible to prevent the image correction process to be performed for an image such as a graphics image having a specific histogram shape definitely different from the histogram shape of an image picture. Further, by checking a distance between the highlight value and shadow value in a histogram, it becomes possible to prevent the image correction process from being performed for an image having a luminance distribution unnatural as a photographic image, e.g., an image formed through CG and having a certain luminance range.

(Forming Luminance Histogram)

Figure 7:
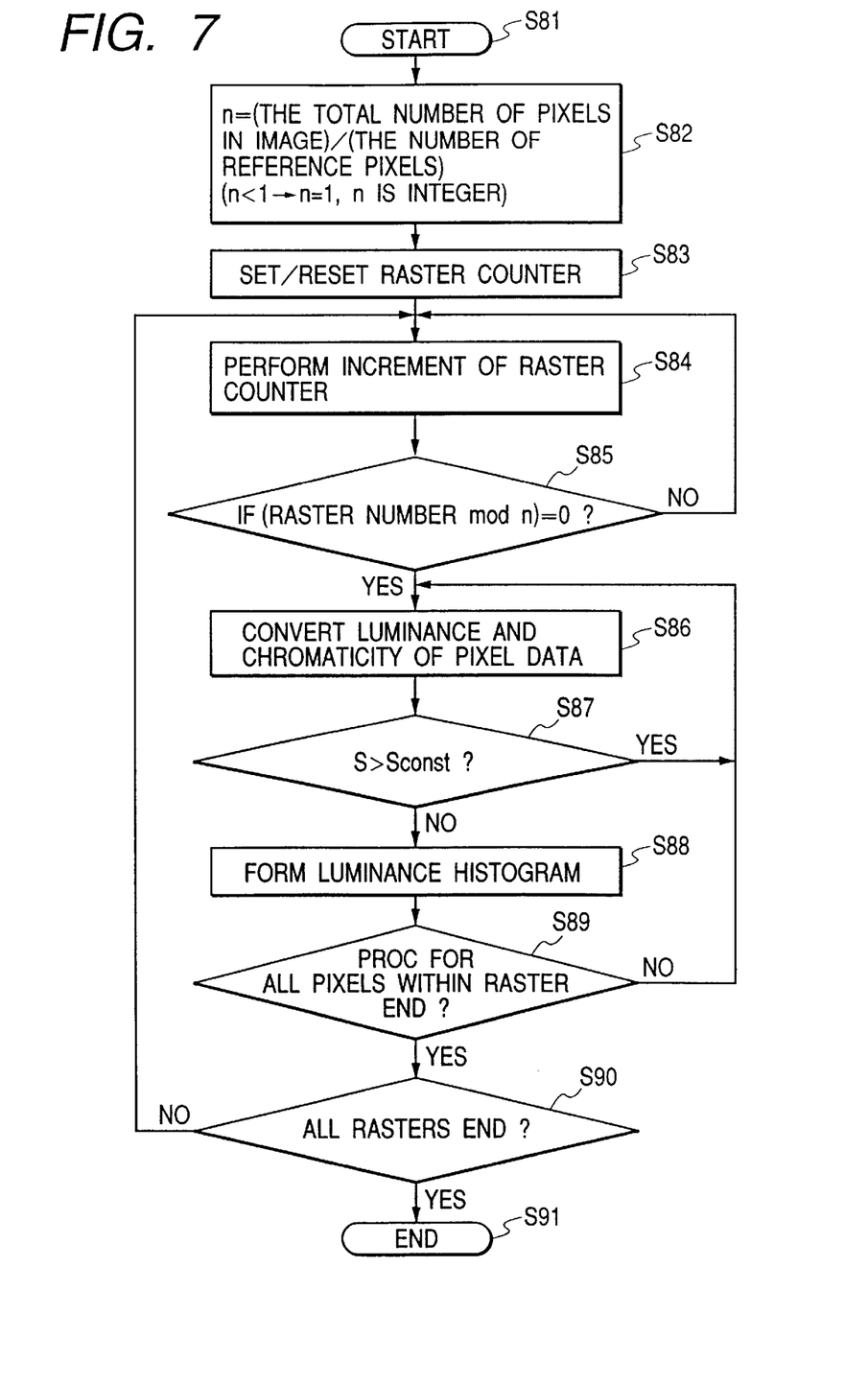
FIG. 7 is a flow chart illustrating a luminance histogram forming process.

FIG. 7 is a flow chart illustrating a process of forming a luminance histogram according to the first embodiment.

Referring to FIG. 7, when a routine of forming a luminance histogram of an original image starts at Step S81, a selection ratio of pixels to be used for forming a luminance histogram is determined from all pixels of an original image. In this embodiment, if an input original image has three hundred and fifty thousand pixels, the luminance histogram is formed by using all pixels (selection ratio of 100%), whereas if an input original image has pixels larger than three hundred and fifty thousand pixels, pixels are selected (sampled) in accordance with a ratio of the total number of pixels to thirty five thousand pixels. For example, if an input original image has one million and five hundred thousand pixels, the luminance histogram is formed at a ratio of ten pixels to one pixel (selection ratio of 10%). The ratio n is calculated from the following equation:

$n$=int[(total number of pixels in original image)/(number of reference pixels 350000)], wherein n is 1 if n<1, and n is an integer.

A counter for managing the raster number is reset/set at Step S83 and the counter is incremented at Step S84.

In this embodiment, pixels are thinned (sampled) in the unit of raster. Therefore, if the selection ratio is 10%, pixels belonging to the raster having the raster number whose modulo 10 is 0 are used as target pixels for processing (Step S85):

[if (raster number modulo n)=0, target raster, else non-target raster]

If the raster is the non-target raster, the flow returns to Step S84. If the raster is the target raster, the flow advances to Step S86 whereat each pixel belonging to the target raster is subjected to luminance conversion and chromaticity conversion. The luminance and chromaticity conversions of the embodiment are performed by the following equations. Instead of the following equations, various other equations may be used.

$$Y(\text{luminance})=\text{int}(0.30R+0.59G+0.11B)$$

(Y is an integer)

$$C1(\text{chromaticity})=R-Y$$

$$C2(\text{chromaticity})=B-Y$$

In this embodiment, in order to improve a detection precision of a white position (highlight point) and a black position (shadow point), a saturation is calculated by the following equation and it is checked whether the calculated saturation is larger than a predetermined saturation value (Sconst) (Step S7). Information of a high saturation pixel is not reflected upon the luminance histogram.

$$\text{Saturation } S=\text{sqrt}(C1^2+C2^2)$$

Namely, if S>Sconst, the flow returns to Step S86 in order not to reflect data of this pixel upon the luminance histogram. The effects of this process will be described by using a specific example. A judgement that a yellow pixel (R=G= 255, B=0) has originally a color of yellow hue is correct in many cases rather than a judgement that the yellow pixel is an achromatic color pixel fogged with yellow. However, the luminance value of the yellow pixel calculated by the above equation is "226" which indicates an extremely high luminance. If this pixel is used for forming the luminance histogram, an error may occur when the white position is detected.

The chromaticity of this yellow pixel calculated by the above equation is "227" which indicates a color of a sufficiently high chromaticity. In this embodiment, therefore, a specific saturation (Sconst) is determined in order to exclude a pixel having a saturation larger than this value Sconst in forming the luminance histogram.

It is therefore possible to avoid any error of white position detection to be caused by such pixels, and a precision of white position detection can be improved.

After the judgement at Step S87, the luminance histogram is formed by using pixels satisfying the condition of S<Sconst (Step S88). The pixel data RGB of this embodiment has 8 bits per each color (256-gradation levels) so that the luminance Y is converted into a depth of 256. Therefore, in forming the luminance histogram, the degrees of each of pixels having 256 luminance values from 0 to 255 are calculated.

The calculated values C1 and C2 are used as the data for calculating an average chromaticity of pixels having the same luminance value in order to perform color fogging correction. In this embodiment, therefore, the data is stored as in the following manner. Three members including the degree, a C1 accumulated value and a C2 accumulated value are set in the format of structural array variables from 0 to 255 and a calculation result of each pixel is reflected upon each member.

It is checked whether all pixels of the target raster have been processed (Step S89). If there is any unprocessed pixel in the target raster, the flow returns to Step S86 to repeat Step S86 and following Steps. If all pixels in the target raster have been processed, it is checked at Step S90 whether there is any unprocessed raster. If all target rasters haven been processed, the routine terminates at Step S91, whereas if there is any unprocessed raster, the flow returns to Step S84 to repeat the above processes.

As above, since the luminance histogram is formed by selecting pixels of an original image, it can be formed by using the necessary minimum number of pixels and by taking into consideration the improvement on a detection precision of white and black positions at a later process.

(Determining Highlight and Shadow Points)

After the luminance histogram is formed, the white position (white point) and black position (shadow point) are determined from the histogram. In this embodiment, the white and black positions are at the positions where the accumulated luminance degree becomes 1750 as counted from both ends at the luminance values 0 and 255.

The luminance value (Yk) when the accumulated degree of $Y0+Y1+\ldots$ exceeds 1750 is the luminance value (k) of the black position, where Yn is the degree of the pixel having the luminance n. Next, an average chromaticity of pixels having the luminance Yk is calculated. As described previously, since the accumulated value of chromaticities of pixels at each luminance value is already calculated when the luminance histogram was formed (the accumulated chromaticities of pixels at the luminance n are represented by C1n total and C2n total), the average chromaticities C1k and C2k of pixels having the luminance value k at the black position are calculated from the following equations:

$$C1k = C1k\ \text{total}/Yk$$

$$C2k = C2k\ \text{total}/Yk$$

The horizontal position is determined in the manner similar to the above. The luminance value (Yw) when the accumulated degree of $Y255+Y254+\ldots$ exceeds 1750 is the luminance value (w) of the white position. Next, an average chromaticity of pixels having the luminance Yw is calculated. The average chromaticities C1w and C2w of pixels having the luminance value w at the white position are calculated from the following equations:

$$C1w = C1w\ \text{total}/Yw$$

$$C2w = C2w\ \text{total}/Yw$$

With the above calculations, the white position (Yw, C1w, C2w) and black position (Yk, C1k, C2k) in the color space "Y, C1, C2" can be obtained.

In this embodiment, although the accumulated degrees are calculated starting from the luminance positions 0 and 255, they may be calculated by providing a predetermined offset, for example, they may be calculated starting from the luminance positions 1 and 254.

(Color Fogging Correction)

After the white and black positions in the color space "Y, C1, C2) are calculated in the above manner, the color fogging correction is performed.

If an original image is an ideal image without any color fogging, achromatic color satisfies R=G=B and the calculated values of chromaticities at the white and black positions satisfy "C1w=C2w=C1k=C2k=0". If there is any color fogging, a straight line (color solid axis) interconnecting the white and black positions (Yw, C1w, C2w) and (Yk, C1k, C2k) is inclined toward the hue direction in proportion to the degree of color fogging. The color fogging correction can be achieved through conversion which makes the color solid axis and Y axis coincide with each other. This may be achieved through rotation and parallel motion of the color solid or through coordinate transformation.

In this embodiment, first the color solid of the original image is rotated to make the color solid axis in parallel to the Y axis by using the lowest luminance point (lower end point) of the color solid axis as a rotation center and by using the color solid axis as a rotation axis. Next, the coordinate system is transformed so that the position of the lowest luminance point becomes an origin of the space "Y', C1', C2'".

Figures 8A, 8B:
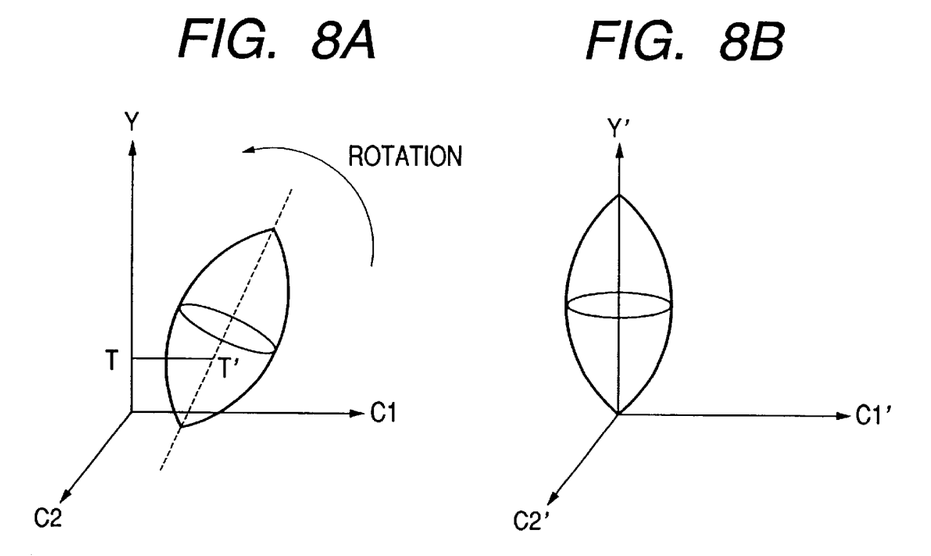
FIGS. 8A and 8B are diagrams illustrating color fogging correction.

The result of color fogging correction of a color solid shown in FIG. 8A is shown in FIG. 8B.

With the above processes, the coordinate transformation process is completed so that the lowest luminance point becomes the origin and the color solid axis becomes coincident with the Y axis.

A method of calculating a rotation matrix for rotating a color solid by a desired angle in the coordinate system with the rotation axis and rotation angle being given in a three-dimensional space, can be performed by using well known techniques so that the description thereof is omitted.

As described above, each pixel of an original image is converted into luminance and chromaticity data (Y, C1, C2) and the coordinate is transformed into (Y', C1', C2') through rotation and parallel motion in the three-dimensional space to thereby perform the color fogging correction.

(Exposure, Saturation Correction)

It is possible to correct a hue shift of an original image by performing the color fogging correction. In order to further improve the image quality, exposure correction and saturation correction are performed.

In this embodiment, over-exposure and under-exposure are checked by a simple manner, and in accordance with this check result, the luminance signal is subjected to gamma correction to correct exposure.

The exposure correction is performed through conversion of input luminance values 0 to 255 into output luminance values 0 to 255 by using a one-dimensional LUT. In this embodiment, LUT can be expressed (refer to FIG. 9) by two straight lines interconnecting three points including the luminance value "Yk" at the black position (shadow point), the luminance value "Yw" at the white position (white point), and the luminance value "T'" at an inflection point between the black and white points.

Figure 9:
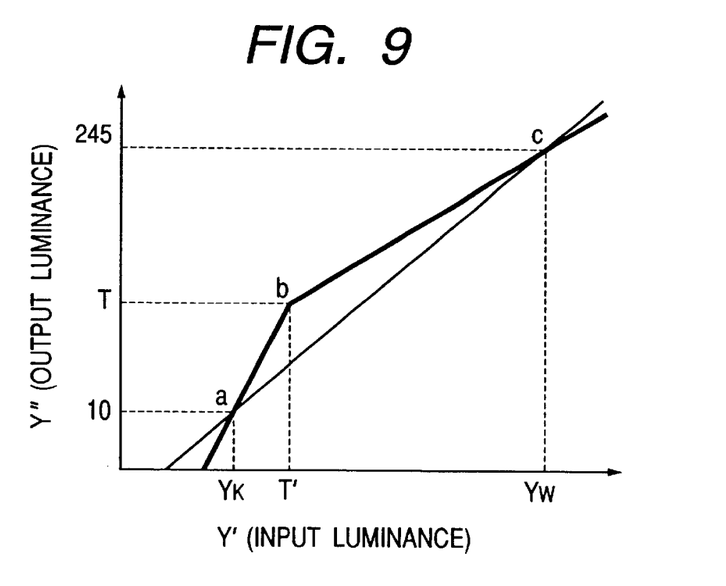
FIG. 9 is a diagram illustrating a LUT for exposure correction.

In this embodiment, the input luminance value "Yk" at the black position is converted into a luminance value "10" and the input white luminance value "Yw" is converted into a luminance value "245". The luminance value "T'" at the inflection point is defined and converted as in the following. Namely, a luminance value "T'" at the inflection point corresponds to a difference between a luminance value "T" and the lowest luminance value of the color solid of an original image, where T is a luminance value corresponding to the shortest distance to the color solid axis. The luminance value T' at the inflection point is converted into the luminance value "T'".

More specifically, as shown in FIG. 9, the black position "Yk" is converted into the luminance value "10" (at point a), the inflection point "T" is converted into the luminance value "T'" (at point b), and the white position "Yw" is converted into the luminance value "245" (at point c). The other luminance values of the original image are converted along the straight lines between a and b points and between b and c points.

The saturation correction may be realized in the following manner. The saturation correction can be performed easily be adjusting a saturation coefficient n in the following equations of chromaticities C1 and C2 of each original image pixel:

$$C1''=n \times C1'$$

$$C2''=n \times C2'$$

The corrections by the embodiment are thus completed. At this time, each pixel of an original image is transformed from color signal data of (R, G, B) into color space data of (Y", C1", C2"). Therefore, the color space data is again inversely transformed into color signal data of (R', G', B'). This inverse transformation can be performed by the following equations:

$$R' = Y'' + C''$$
$$G' = Y'' - (0.3/0.59) \times C1'' - (0.11/0.59) \times C2''$$
$$B' = Y'' + C2''$$

In this embodiment, the image correction process first performs the color fogging correction and then performs under- and over-exposure corrections or so-called contrast adjustment. This process order may be reversed. The method of determining the highlight point and shadow point and the algorithm for image correction are not limited to those described above, but various other methods and algorithms may also be used.

Also in the embodiment, although simple averaging is used for forming a lightness histogram, the histogram may be formed in accordance with color components representative of lightness, which lightness histogram placing importance on blue color components more than the luminance histogram.

Also in the embodiment, the luminance values having the degree 0 are counted for forming the luminance histogram. Instead, the luminance values having a degree near 0 such as 1 may also be counted.

Second Embodiment

In the image processing method of the second embodiment, RGB original image data of each pixel is converted into luminance data representing lightness and color difference (chromaticity) data representing hue. After a luminance histogram is formed, a highlight point (white position) and a shadow point (black position) are determined to be at luminance positions (luminance values) where the accumulated degrees as counted from the high and low luminance side exceed a predetermined value. In order to improve a detection precision of the highlight and shadow points, a process of excluding high saturation pixels in forming the luminance histogram or other processes may be executed. If the size of data of an original image is larger than a predetermined value, pixels may be thinned and selected to form the histogram.

Color balance correction of the second embodiment is performed by paying attention to the highlight and shadow points in an original image. More specifically, an image having a matched color balance has a high possibility that it has a color difference of 0 and a highest luminance at the highlight point, i.e., white, and a color difference of 0 and a luminance of 0, i.e., black.

The outline of the color balance correction to be executed by the color image processing of the second embodiment is:

(1) In a color space having three axes of color difference signals and a luminance, a color solid axis of an image is determined by using average values of color differences at the highlight and shadow points and their luminance values. The color solid axis is made coincident with the luminance axis through rotation and parallel motion.

(2) When the color solid axis is made coincident with the luminance axis, the color solid is expanded or compressed in order to adjust the contrast and saturation of the image.

The second embodiment will be detailed with reference to the accompanying drawings. The system of the second embodiment is similar to the system of the first embodiment shown in FIG. 1.

The process to be executed by the image correction process unit of the second embodiment will be described specifically with reference to FIG. 10. A color unbalance of an original image represented by image drawing instruction is corrected by the following process which is not performed for another image represented by drawing instructions different from the image drawing instruction.

First, at Step S100 a histogram of an original image is formed in accordance with which the highlight and shadow points are determined.

(Determining Highlight and Shadow Points)

In order to determine the highlight and shadow points of an original image, a luminance signal Y and color difference signals (C1 and C2) of each pixel are calculated. In this embodiment, the luminance and color difference signals are calculated by the following equations:

$$Y \text{ (luminance)} = 0.30\ R + 0.59\ G + 0.11\ B$$
$$C1 \text{ (color difference)} = R - Y$$
$$C2 \text{ (color difference)} = B - Y$$

The pixel data RGB of this embodiment has 8 bits per each color (256-gradation levels) so that the luminance Y is converted into a depth of 256. Therefore, in forming the luminance histogram, the degrees of each of pixels having 256 luminance values from 0 to 255 are calculated.

The calculated values C1 and C2 are used as the data for calculating an average chromaticity of pixels having the same luminance value in order to perform color fogging correction. In this embodiment, therefore, the data is stored as in the following manner. Three members including the degree, a C1 accumulated value and a C2 accumulated value are set in the format of structural array variables from 0 to 255 and a calculation result of each pixel is reflected (incremented) upon each member.

As above, a luminance histogram is formed for an image to be corrected, and then the highlight and shadow points are determined from the luminance histogram. In this embodiment, for example, for image data having 350000 pixels, 3500 pixels about 1% thereof are used as the threshold value. The white and black positions are determined to be at the positions where the accumulated luminance degree takes the threshold value, as counted from both ends at the luminance values 0 and 255.

More specifically, the luminance value (Yk) when the accumulated degree of Y0+Y1+ . . . exceeds 3500 is the luminance value (k) at the shadow point, where Yn is the degree of the pixel having the luminance n. Next, an average color difference of pixels having the luminance Yk is calculated. As described previously, since the accumulated value of color differences of pixels at each luminance value is already calculated when the luminance histogram was formed (the accumulated color difference values of pixels at the luminance n are represented by C1n total and C2n total), the average color difference values C1k and C2k of pixels having the luminance value k at the black position are calculated from the following equations:

$$C1k=C1k\ \text{total}/Yk$$

$$C2k=C2k\ \text{total}/Yk$$

Similarly, the luminance value (Yw) when the accumulated degree of Y255+Y254+ . . . exceeds 3500 is the luminance value (w) at the highlight point. Next, the average color difference values C1w and C2w of pixels having the luminance value w at the white position are calculated from the following equations:

$$C1w=C1w\ \text{total}/Yw$$

$$C2w=C2w\ \text{total}/Yw$$

With the above calculations, the highlight point (C1w, C2w, Yw) and shadow point (C1k, C2k, Yk) in the color space "C1, C2, Y" can be obtained.

In this embodiment, although the accumulated degrees are calculated starting from the luminance positions 0 and 255, they may be calculated by providing a predetermined offset, for example, they may be calculated starting from the luminance positions 1 and 254.

A method of determining the highlight and shadow points is not limited only to the above.

For example, a method described in Japanese Patent Application Laid-Open No. 60-57594 may be used in which an accumulated degree histogram is formed by using weighted and added luminance signals of each of input color signal R, G and B and the upper and lower limit values are set as the highlight and shadow points, the upper and lower limit values corresponding to predetermined accumulated degrees, e.g., 1% and 99% respectively.

In place of the luminance signal, a signal representative of lightness may be calculated to form a histogram.

Next, at Step S110 an image correction process is performed by using the highlight and shadow points determined at Step S100. In this embodiment, the image correction process includes color fogging correction for correcting color fogging of an original image, contrast correction for adjusting a luminance contrast of the original image, and saturation correction for improving the image quality.

(Image Correction Process)

The color fogging correction and luminance contrast correction are performed in accordance with the highlight and shadow points of an original image in the color space (C1, C2, Y).

Figure 11A:
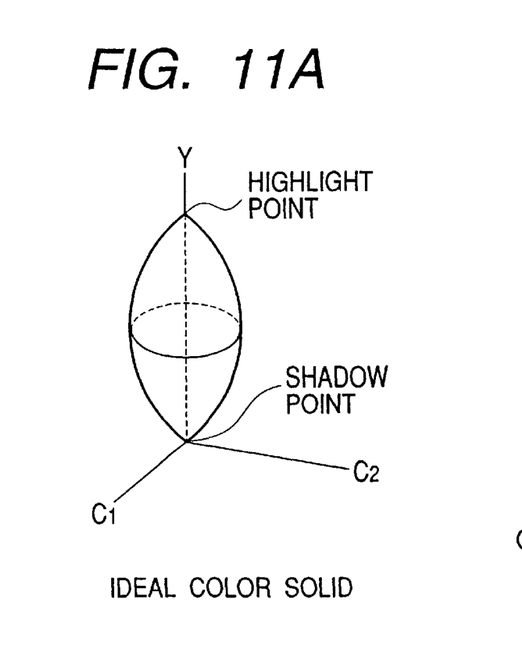
FIGS. 11A and 11B are diagrams illustrating the principle of color balance correction.

If an original image is an ideal image without any color fogging, achromatic color satisfies R=G=B and the calculated values of color differences at the highlight and shadow points are all 0. Namely, if the image has a color solid such as shown in FIG. 11A, it can be said that the image is an ideal image.

Figure 11B:
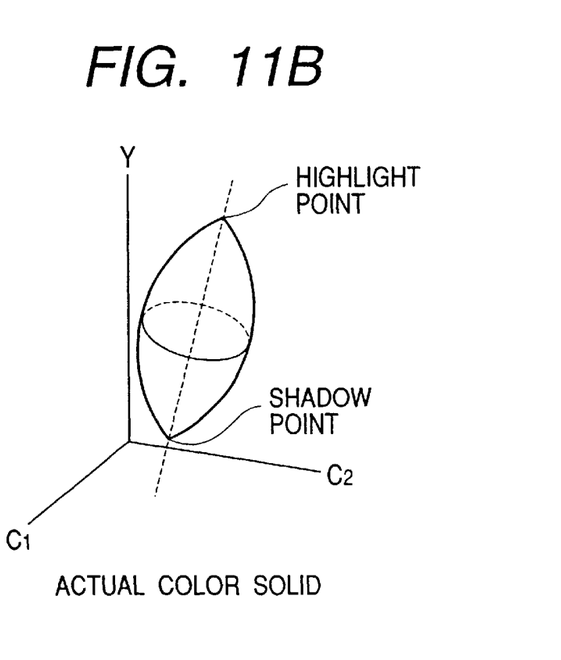

However, as shown in FIG. 11B, if there is any color fogging, a straight line (color solid axis) interconnecting the highlight and shadow points (C1w, C2w, Yw) and (C1k, C2k, Yk) is inclined toward the hue direction in proportion to the degree of fogging. The color fogging correction can be achieved through conversion which makes the color solid axis and Y axis of the color solid coincide with each other. This may be achieved through rotation and parallel motion of the color solid or through coordinate transformation. In this embodiment, first the color solid of the original image is moved to the coordinate system having as its origin the shadow point of the color solid axis, and in this coordinate system, the color solid is rotated to make the color solid axis in parallel to the Y axis around the origin of the shadow point or origin. A method of calculating a rotation matrix for rotating a coordinate system by a desired angle in the coordinate system with the rotation axis and rotation angle being given in a three-dimensional space, can be performed by using well known techniques so that the description thereof is omitted. Then, parallel motion of the color solid is performed so as to make the rotated color solid axis is superposed upon the Y axis.

As above, by correcting the color solid of an original image, the color fogging of the original image can be corrected.

Next, for the luminance contrast adjustment in this embodiment, the luminance at the shadow point is adjusted to "0" or a value near to it (e.g., 10) and the luminance at the highlight point is adjusted to "255" or a value near to it (e.g., 245). This corresponds to expansion (compression) of the color solid made upright through rotation toward the luminance axis direction.

The saturation correction may be performed in the following manner. The saturation corresponds to a distance when color difference signals are used. If all saturations are to be raised by 20% or more, C1 and C2 are multiplied by 1.20 (which is a saturation coefficient). This means expansion (compression) toward the C1 and C2 plan directions.

In this embodiment, the expansion (compression) coefficient for the luminance contrast adjustment is applied to the whole of the color solid, so that the saturation correction is automatically performed when the luminance contrast is corrected.

As above, the degree of saturation correction is changed with the degree of luminance contrast adjustment so that the luminance and saturation corrections suitable for an original image can be automatically performed. An expansion factor for the luminance contrast adjustment is determined from a ratio of a luminance range before conversion to that after conversion.

If a user wishes particular saturation adjustment, a corresponding saturation coefficient is determined and the luminance correction and saturation correction may be performed at different processes.

As above, each pixel of an original image is converted into a luminance signal and color difference signals (C1, C2, Y), and the color solid is subjected to rotation, parallel motion, and expansion (compression) in a three-dimensional color space. It is therefore possible to perform color fogging correction, contrast correction and saturation correction at the same time or independently.

Lastly, inverse transformation to the RGB signals is performed to complete the conversion. The inverse transformation is performed by the following equations:

$$R' = Y' + C1'$$
$$G' = Y' - (0.3/0.59) \times C1' - (0.11/0.59) \times C2'$$
$$B' = Y' + C2'$$

As described above, a histogram is formed by using pixel data of an original image, pixel data is detected at positions where the accumulated pixel values take the predetermined degree, and in accordance with the detected pixel data, a color balance is corrected in the three-dimensional color space. Accordingly, an image processing method can be realized which is capable of reliably correcting color fogging, contrast and saturation, with a small process load.

Third Embodiment

Next, the third embodiment will be described which considers the degree of correction more than the second embodiment.

If a color solid axis of an original image is inclined too much and this inclination is corrected by the method of the second embodiment, some practical problems may occur. Such a large inclination may occur, for example, if a color filter typically an LB filter is used for intentionally providing color fogging or a specific scene such as a sunset glow is photographed.

In such cases, it is judged that an original image is a special case and the correction is not performed or the degree of correction is weakened to properly adjust the rotation angle.

For example, in the case of an image with special effects using an LB filer, an orthogonal projection of a color solid axis upon a color difference signal plane directs toward the red hue direction. Whether the color of which hue is fogged in an original image can be easily judged from the direction of the color solid axis.

An angle between the directional vector of a color solid axis and the luminance axis is paid attention. For example, if the directional vector is a red hue direction or the angle is 40 degrees or larger, it is judged that the original image is a special case. In this case, the correction is not performed or the degree of correction is weakened.

For example, the characteristic values (hue and angle of orthogonal projection) of each of a variety of color filters are investigated in advance and stored, and the characteristic values are compared with the characteristic values of an original image so that the image taken with each of a plurality of color filters can be detected.

The degree of correction may be manually designated by a user or may be set in advance in accordance with the angle and the direction of a color solid axis. For example, if the angle is 40 degrees, the degree of correction can be adjusted by rotating by only 20 degrees to make upright the color solid of the original image.

If the characteristic values of a color filter are registered, the detection precision can be improved. As a method of registering the characteristic values of a color filter, for example, a register mode is provided, and an average of characteristic values of the color filter is calculated by using a plurality of original images taken with the color filter and stored in correspondence with a color filter name. When the register mode is set, the stored average characteristic value is selected by using the color filter name as a search key.

As above, according to the third embodiment, whether the image is corrected or whether the degree of correction is adjusted can be judged by setting at least two threshold values of a correction angle in accordance with an inclination of the color solid axis, i.e., two values of the direction of the axis and the rotation angle. Therefore, any problem to be caused by image correction of a special case can be avoided very simply.

Figure 10:
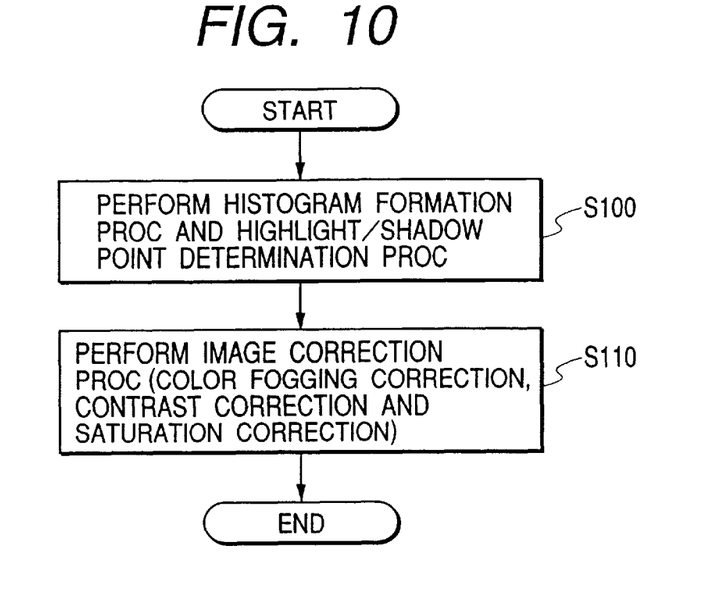
FIG. 10 is a flow chart illustrating image processing to be executed by the image correction process unit.

The special case detection process is inserted between Steps S100 and S110 shown in FIG. 10. It is therefore possible to prevent the image correction process of the second embodiment from being performed for the special case.

Fourth Embodiment

Next, the fourth embodiment will be described which provides a function of more strictly judging whether image correction is performed, than the second and third embodiments.

Figure 12:
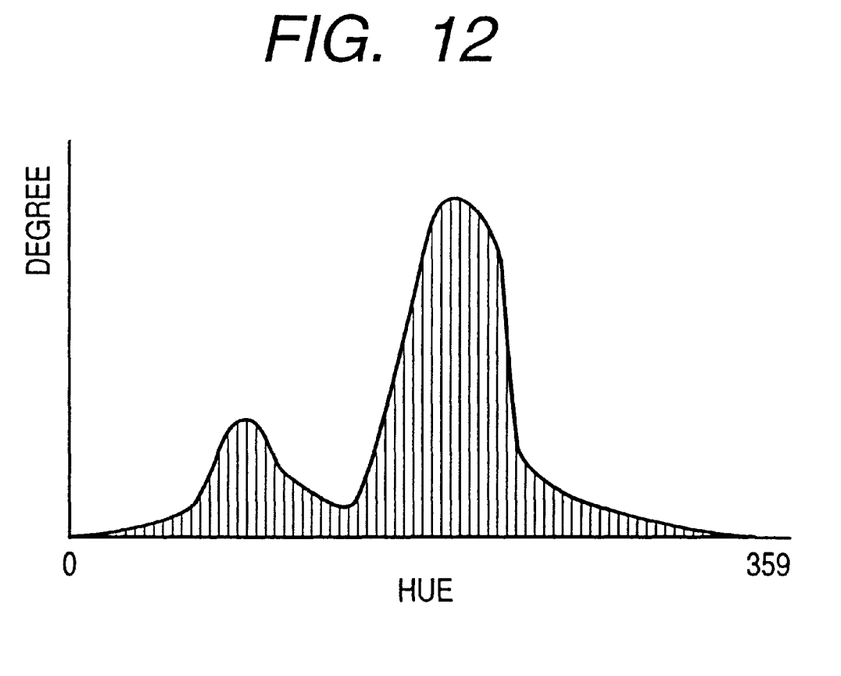
FIG. 12 shows an example of a hue histogram of pixels of an original image.

In order to analyze an image, a hue histogram of each pixel is formed as shown in FIG. 12 by using color difference signals of each pixel, and the dispersive values of the histogram are obtained. The pixels are sampled (thinned) to a degree that the image can be recognized as a whole, so that the process load can be lowered. For example, if the number of pixels like a thumbnail image is used, an original photographic image can be recognized sufficiently. Therefore, the number of pixels is sufficient if it is about the number of pixels of a thumbnail image. In this embodiment, a hue H is calculated from the following equation:

$$H=\operatorname{atan}(C1/C2)[0°, \ldots 360°]$$

For example, if an image is taken by using an LB filter, the image has a hue limited to some extent over the whole image area by the characteristics of the filter. If an image is taken with a color filter that passes only wavelengths in a particular range, the limited hue becomes more definite. A sepia photograph having boomed recently has intentional color fogging more or less. Therefore, such images should avoid color fogging correction.

Such images have smaller dispersive values. By setting a threshold value for the dispersive value, photographs intended to provide special effects can be discriminated from other photographs. This can be applied not only to photographs but also to such original images (objects) having a predetermined hue such as graphics images. The image correction of the first embodiment can be avoided for such images.

In the third embodiment, an angle and distance of an orthogonal projection of the luminance axis upon the hue plane are used for discriminating special images from other images. The precision of this third embodiment method can be improved further by incorporating the dispersive values of the fourth embodiment.

More specifically, if the orthogonal projection of the luminance axis enters a particular hue range and its distance is longer than a predetermined value, the dispersive values are checked to judge whether color fogging is present on the whole image.

For example, if an image is taken with a filter passing only a particular wavelength, the whole image has a predetermined hue so that it can be discriminated from other images having large color fogging in the highlight or shadow areas.

In this embodiment, a hue is calculated from the color difference values obtained at Step S100 shown in FIG. 10 to form a hue histogram separately from the luminance histogram.

An image of a special case is detected in accordance with the hue histogram.

If the fourth embodiment is combined with the third embodiment, the hue histogram in addition to the luminance histogram is formed at Step S100 shown in FIG. 10, and an image of a special case is detected between Steps S110 and S100 in accordance with the hue histogram.

According to the fourth embodiment, it is possible to check from the hue of the whole image whether color fogging of an image was intentionally provided. If the image has the intentional color fogging, the image correction is not performed but the image formed based upon the photographer intention can be output directly.

Other Embodiments

In the above embodiments, the image correction process first performs the color fogging correction and then performs under- and over-exposure corrections or so-called contrast adjustment. This process order may be reversed. The method of determining the highlight point and shadow point and the algorithm for image correction are not limited to those described above, but various other methods and algorithms may also be used.

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program codes themselves and means for supplying such program codes to a computer, e.g., a storage medium storing such program codes, constitute the present invention.

The storage medium storing such program codes may be a floppy disk, a hard disk, an optical disk, a magneto-optical disk, a CD-ROM, a magnetic tape, a non-volatile memory card, a ROM, and the like.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. An image processing method comprising the steps of:

forming a histogram of lightness of an original image;

setting a correction condition for lightness components in accordance with the histogram of lightness;

setting a correction condition for hue components in accordance with the correction condition for lightness; and correcting the original image in accordance with the correction conditions for lightness and hue, wherein said correcting step corrects the original image by shifting a pixel value of the original image in a three-dimensional color space on the basis of the correction condition for lightness components and the correction condition for hue components.

2. An image processing method according to claim 1, further comprising the steps of:

obtaining a highlight point and a shadow point in accordance with the histogram of lightness; and correcting color fogging in accordance with the obtained highlight and shadow points.

3. An image processing method according to claim 1, wherein correct image data is subjected to a color correction in accordance with an input device, and an image is output in accordance with the color corrected image data.

4. An image processing apparatus comprising:

means for forming a histogram of lightness of an original image;

means for setting a correction condition for lightness components in accordance with the histogram of lightness;

means for setting a correction condition for hue components in accordance with the correction condition for lightness; and means for correcting the original image in accordance with the correction conditions for lightness and hue, wherein said correcting means corrects the original image by shifting a pixel value of the original image in a three-dimensional color space on the basis of the correction condition for lightness components and the correction condition for hue components.

5. A computer readable storage medium storing program steps for executing functions of an image processing apparatus, the program steps comprising:

forming a histogram of lightness of an original image;

setting a correction condition for lightness components in accordance with the histogram of lightness;

setting a correction condition for hue components in accordance with the correction condition for lightness; and correcting the original image in accordance with the correction conditions for lightness and hue, wherein said correcting step corrects the original image by shifting a pixel value of the original image in a three-dimensional color space on the basis of the correction condition for lightness components and the correction condition for hue components.

* * * * *